United States Patent [19]
Waterman

[11] 3,719,923
[45] March 6, 1973

[54] PULSE DOPPLER AND NAVIGATION SYSTEM

[75] Inventor: Glenn Noble Waterman, Salt Lake City, Utah

[73] Assignee: Edo Western Corporation, Salt Lake City, Utah

[22] Filed: Sept. 11, 1969

[21] Appl. No.: 857,170

Related U.S. Application Data

[63] Continuation-in-part of Ser. No. 818,893, April 24, 1969, Pat. No. 3,594,716.

[52] U.S. Cl. .................................. 340/3 D, 343/9
[51] Int. Cl. .................................................. G01s 9/66
[58] Field of Search ............ 340/3, 3 D; 343/8, 9, 7 A

[56] References Cited

UNITED STATES PATENTS

| | | |
|---|---|---|
| 3,491,333 | 1/1970 | Goulet et al. ........................ 340/3 |
| 1,864,638 | 6/1932 | Chilowsky ........................... 340/3 |
| 3,257,638 | 6/1966 | Kritz et al. .......................... 340/3 |
| 3,065,463 | 11/1962 | Turner ............................... 343/9 |
| 2,908,888 | 10/1959 | Kirkland ............................ 340/3 |
| 3,436,721 | 4/1969 | Farr .................................. 340/3 |
| 3,496,524 | 2/1970 | Stavis et al. ........................ 340/3 |

*Primary Examiner*—Richard A. Farley
*Attorney*—David V. Trash and William S. Britt

[57] ABSTRACT

A vessel navigation system employs gated transmitting and receiving transducers for developing pulsed Doppler frequency shifted signals indicative of velocity components along selected orthogonal axes. Gated feedback arrangements are employed to produce continuous oscillations having the same frequency as the Doppler shifted signals. The signals are converted to digital form, and processed to yield, inter alia, velocity, drift angle, and distance information.

The information is corrected to compensate for variations in the acoustical propagating characteristic of the ocean medium, and provision is made for obtaining reliable data under severe rolling conditions.

35 Claims, 23 Drawing Figures

INVENTOR.
GLENN NOBLE WATERMAN
BY
Davis, Hoxie, Faithfull & Hapgood
ATTORNEYS

INVENTOR.
GLENN NOBLE WATERMAN
BY
Davis, Hoxie, Faithfull & Hapgood
ATTORNEYS

PULSE DOPPLER AND NAVIGATION SYSTEM

This application is a continuation-in-part of my copending application Ser. No. 818,893, filed Apr. 24, 1969 now U.S. Pat. No. 3,594,716.

This invention relates to electronic navigation apparatus and, more specifically, to a pulsed system employing the Doppler "apparent frequency shift" principle for measuring velocity components of a ship, and quantities derived therefrom.

It is desirable that personnel operating a ship at sea know the velocity components of the vessel along two orthogonal coordinate axes, e.g., fore-aft and port-starboard for the direction of actual travel, or with respect to a desired course and along an azimuth normal thereto. In addition to the velocity information which is useful per se, other quantities may be computed from the determined velocity values, such as distance traveled and/or distance to go, and long and short term drift angles with respect to a desired course.

Moreover, this measured and derived velocity and position information becomes especially important in some applications requiring very precise navigation. Such applications include, for example, underwater exploration and survey, and military precise pattern travel as for mine sweeping or laying.

It is an object of the present invention to provide an improved marine navigation system.

More specifically, an object of the present invention is the provision of a pulsed wave Doppler navigation system which employs gated feedback circuitry for maintaining continuous replicas of returned frequency-shifted signals, and digital circuitry for accurately and reliably computing instantaneous velocity components of a vessel along selected orthogonal axes.

Another object of the present invention is the provision of a Doppler navigation system which computes and displays distance and drift angle information derived from measured velocity data.

Still another object of the present invention is the provision of a Doppler navigation system which includes apparatus for readily selecting coordinate axes along which vessel velocity is to be determined.

Yet another object of the present invention is the provision of a Doppler navigation system which is operative under severe ship-rolling conditions, and also operative in extreme water depths.

The above and other objects of the present invention are realized in a specific, illustrative navigation system employing two essentially independent channels for measuring and displaying vessel velocity along two selected orthogonal axes. Each channel includes a time shared transducer for transmitting repetitive pulse bursts of sinusoidal energy directed along an associated sensing axis and, sometime thereafter, for generating an electrical output responsive to a returned portion of the transmitted signal reflected by the ocean bottom, or by some other scattering medium. If the ship has any motion along the axis being examined, there will be an apparent increase or decrease in frequency of the reflected signal.

The returned signal is supplied to a gated feedback loop which generates at its output a continuous periodic signal of a frequency corresponding to that of the returned Doppler frequency shifted pulses. The feedback circuitry is rendered operative by a strobe signal during the mid portion of the returned signal.

A measure of the emitted signal and the continuous replica of the returned pulses are mixed, converted to digital form, and processed to identify the particular direction of motion, if any, along each axis. Circuitry is provided to develop a sequence of pulses characterized by a repetition rate dependent upon the apparent Doppler frequency shift. A counter is employed to count the number of velocity-indicating pulses occurring within a repetitive time gate period which is corrected for variations in the temperature and salinity of the water, these parameters being factors in the frequency shifting process. The pulses accumulated during the periodically recurring time gate intervals are a direct measure of absolute axial velocity, and are converted to appropriate output displays which may be spaced about the ship.

Similarly, the number of cycles of the continuous wave, corrected for propagation variations in the water medium, are counted and displayed to yield the distance traveled along the sensed axis. Correspondingly, displays are provided for velocity and distance for the other axis. Drift angle information is developed by employing a trigonometric operation on the orthogonal distances (long term drift) or velocities (instantaneous drift).

The above and other objects, features and advantages of the present invention are realized in a specific, illustrative embodiment thereof, presented hereinbelow in conjunction with the accompanying drawing, in which.

Figure 9B:
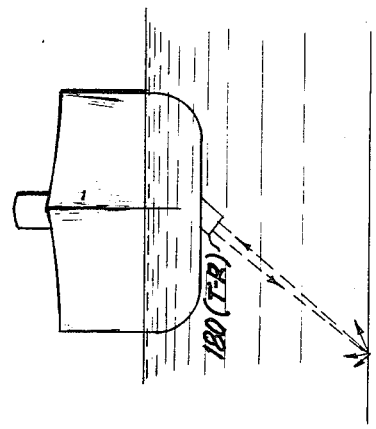
FIGS. 9A and 9B are orthogonal views respectively depicting fore-aft and port-starboard energy radiation and reflection paths for the pulsed Doppler system of FIGS. 1–6.
Figure 9A:
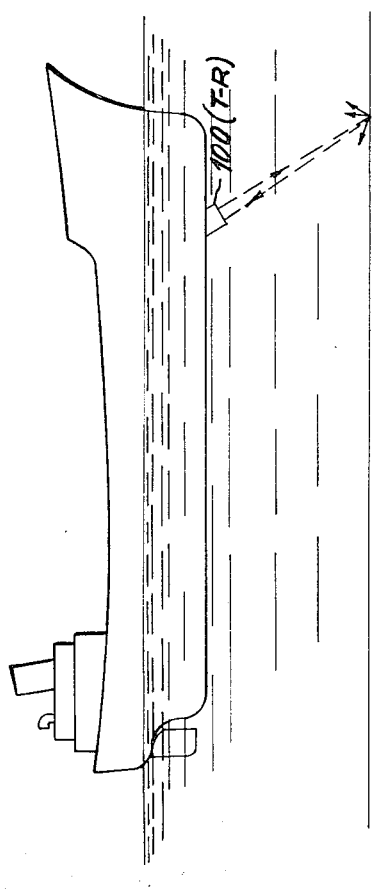

In accordance with the principles of the present invention, the velocity of a ship along selected orthogonal axes, e.g., fore-aft and port-starboard is developed by digitally processing a regenerated continuous wave replica of pulsed Doppler "apparent" frequency shifted signals. To this end, a transducer 100 (FIG. 9A) is employed under the ship and oriented to periodically radiate energy forward and downward along the fore-aft axis. The radiated energy may illustratively comprise pulsed bursts of a sinusoidal wave having a relatively high frequency such as 150 k.c. to ensure operation for all types of sea floors, and with a good depth capability. A part of the emitted energy is scattered and reflected by the ocean bottom, or by any other scattering medium such as a stationary water mass, thermal boundary, algae particles or the like. The transducer 100, when operated in a receiving mode, receives a portion of the reflected energy, and converts it into electrical form.

As is well known, there is an apparent frequency shift of a signal transmitted between two points having a relative motion therebetween. In the instant application, the frequency of the signal received by the transducer 100 ($f_r$) will be higher than that emitted by the transducer ($f_o$) if the ship has a forward velocity component, and smaller than $f_o$ if the ship is moving astern. In particular, the Doppler frequency shift $f_r-f_o$ is directly proportional to the ship's forward velocity and inversely proportional to the propagational speed of the emitted and returned wave through the water. Thus, by proper scaling of the system, the frequency difference $f_r-f_o$ yields a direct measure of the ship's fore-aft speed when the system is corrected for variations in the acoustical wave propagation speed of water in the manner discussed below.

Similarly, there is a transmitting-receiving transducer 180 (FIG. 9B) oriented to starboard and downward for measuring a velocity component orthogonal to the alignment of the transducer 100, this being port-starboard for the assumed situation.

Figure 10:
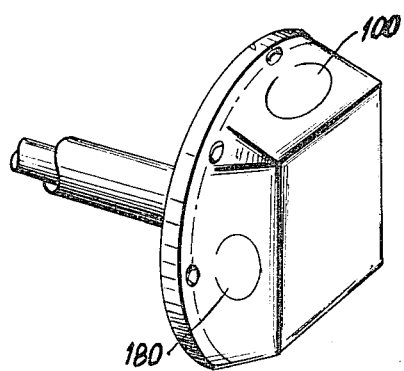
FIG. 10 illustrates one embodiment of a transducer array employed in the system of FIGS. 1–6.

The transducers 100 and 180 may comprise individual units orthogonally aligned as described above or, alternatively, two transducer elements mounted on a single pod as shown in FIG. 10. For the pod array, the transducers 100 and 180 are mounted at right angles to each other on sloping surfaces about the lower portion of the pod.

Figure 11:
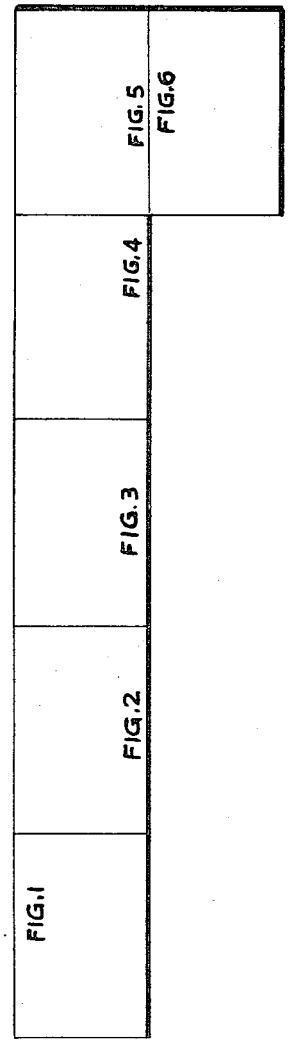
FIG. 11 depicts the spatial organization of FIGS. 1–6.

Referring now to FIGS. 1–6, arranged as in FIG. 11, there is shown an electronic navigation system for developing the desired velocity and other information employing the above-described Doppler frequency shifting principles. The arrangement includes an oscillator 145 (FIG. 1) for selectively imparting sinusoidal energy to the for-aft and the port-starboard transducers 100 and 180, it being assumed at this point that data along, and normal to the direction of actual ship's motion is desired. Examining the signal flow and processing associated with fore-aft velocity, which is illustrative of the computational operations for the other speed measurement, a gate circuit 148 is periodically opened to pass pulsed sinusoidal energy from the oscillator 145 to the transducer 100 by way of a power amplifier 150. The gate 148 is opened for the duration of a "transmit" pulses which repetitively appear at the "1" output of a one shot multivibrator 158 as discussed below. During these energy radiating, or transmitting periods, the relatively low output voltage at the "0" output of the one shot multivibrator 158 gates off (blanks) a signal receiving amplifier 110 which cannot supply an output signal during pulse radiation.

The sinusoidal energy burst emitted by the transducer 100 is directed forward toward the ocean bottom, and is in part reflected back and recovered by the transducer 100 sometime later after the transmit period terminates. Depending upon the motion of the ship, the signal frequency generated by the transducer 100 is either greater than, less than, or the same as that which it previously emitted.

The recovered pulsed return signal is supplied by the transducer 100 to the amplifier 110 through a limiting net work 105 which further protects the amplifier 110 against damage and extraneous noise by limiting the peak signal values it will pass. The limiting network 105 may comprise bipolar voltage clamps or the like.

The amplifier 110 is gated on during the receiving interval by the relatively high voltage at the one shot multivibrator 158 "0" output terminal following each transmit pulse. The amplifier output, comprising Doppler frequency shifted sinusoidal bursts, is supplied to a threshold circuit 140, e.g., a Schmidt trigger, where the amplitude of the signals is examined. If the signals are insufficient in amplitude to switch the threshold circuit 140, they are termed spurious noise signals and no further circuit action takes place. If true signals are being processed, the threshold circuit 140 develops at its output bursts of square waveforms which correspond in number and in frequency to the input pulsed sinusoidal wave.

Figure 1:
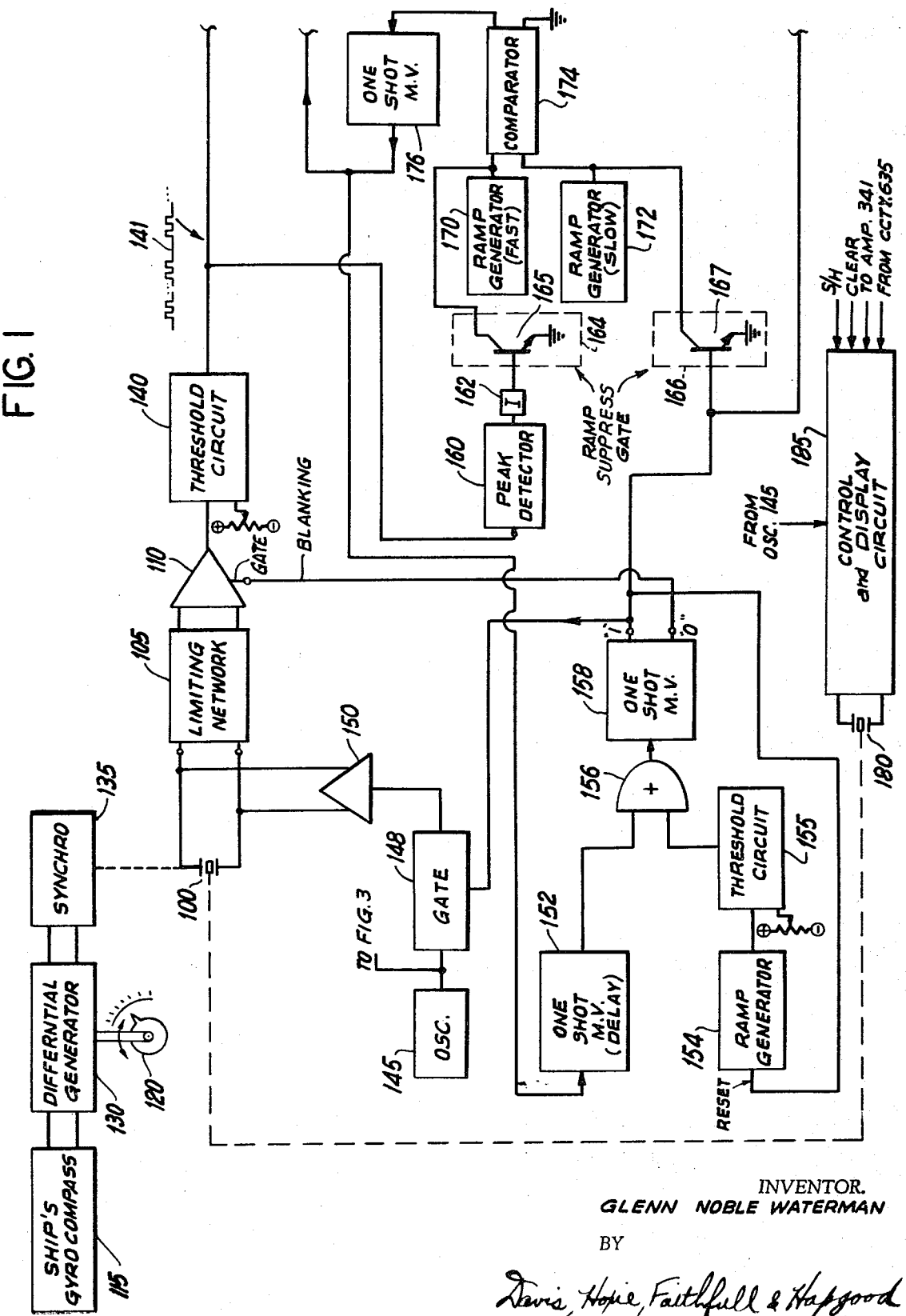
FIGS. 1 through 6 depict an illustrative pulsed Doppler navigation system embodying the principles of the present invention.
Figure 2:
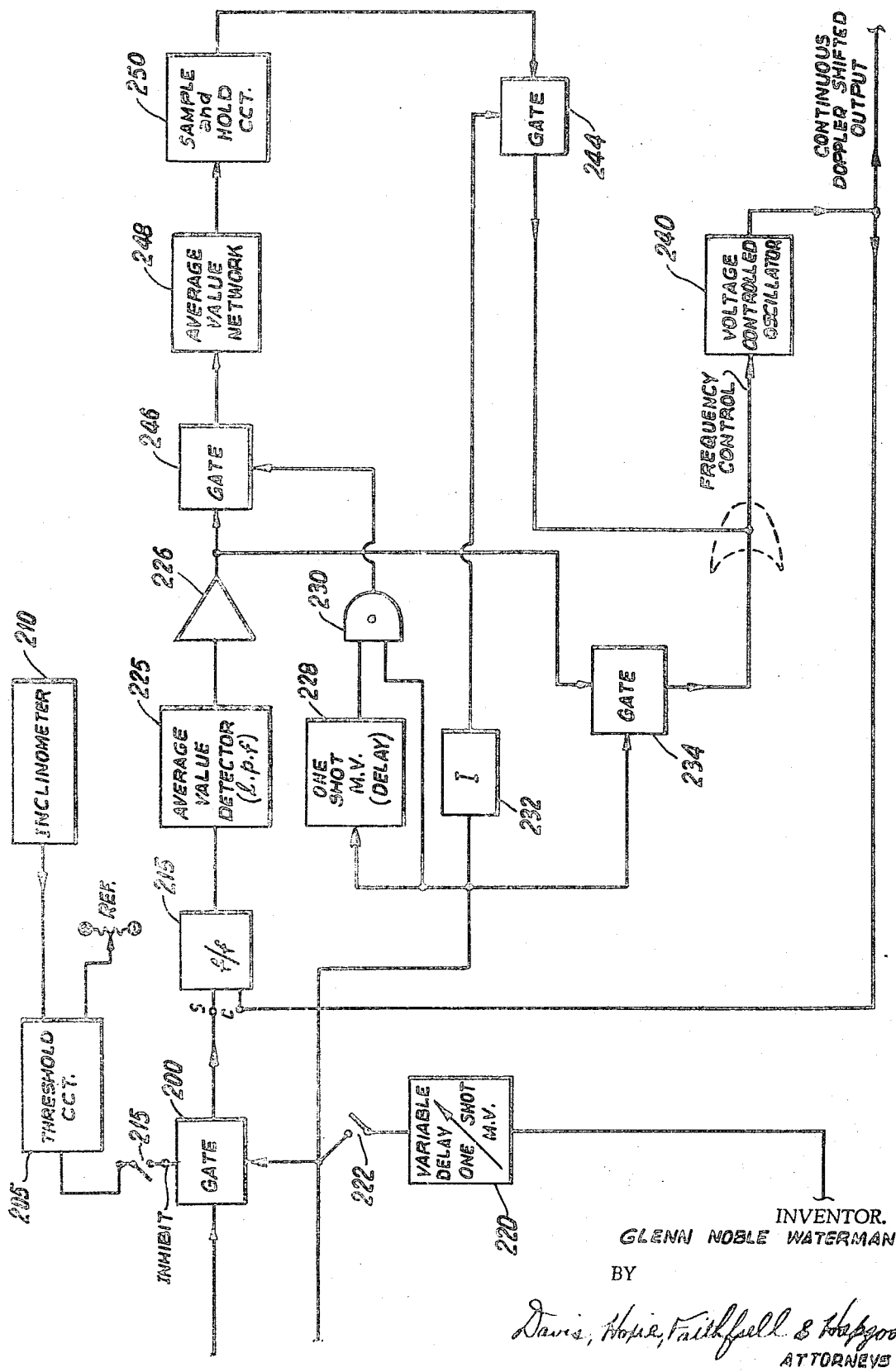
Figure 3:
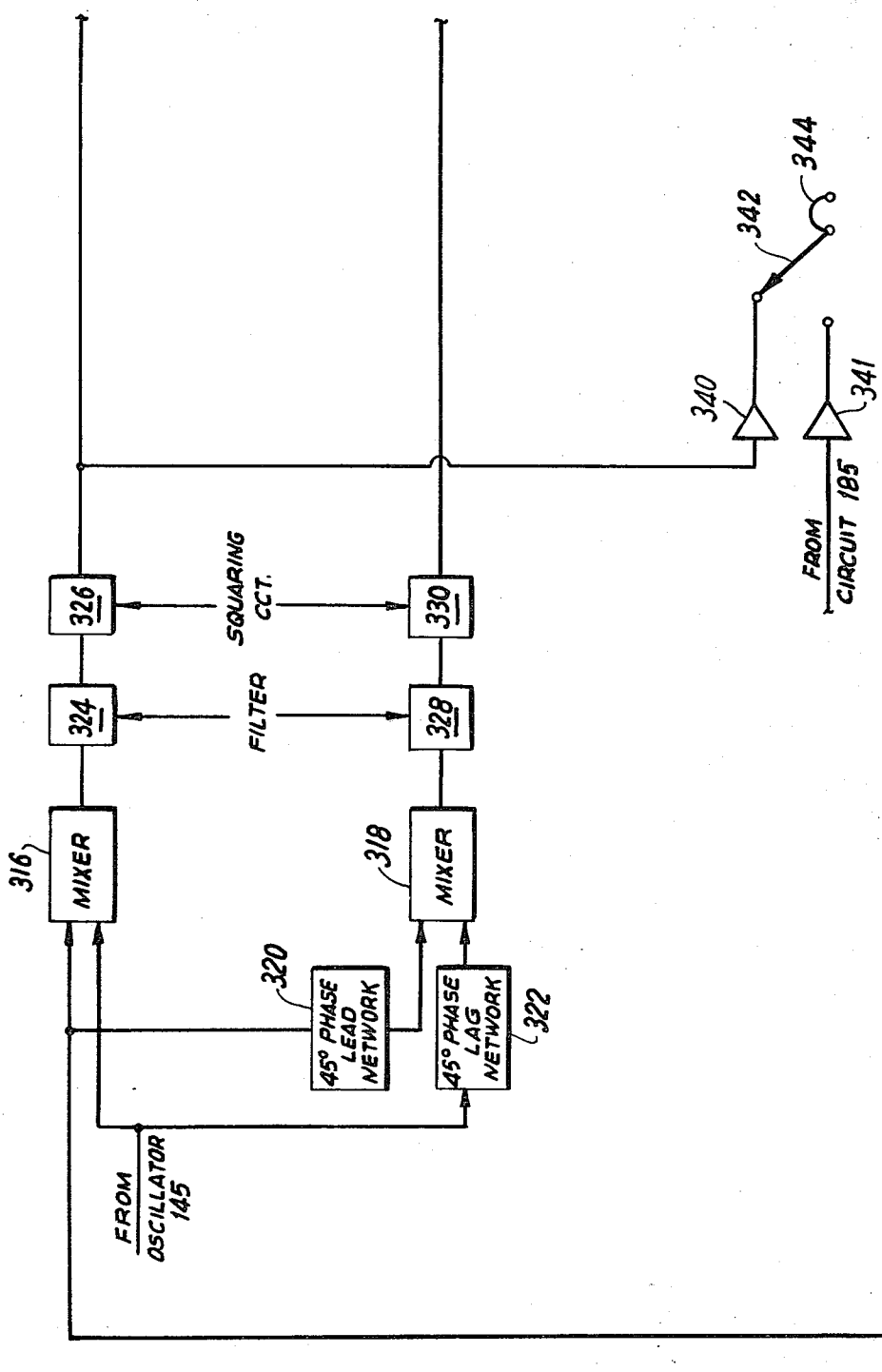
Figure 4:
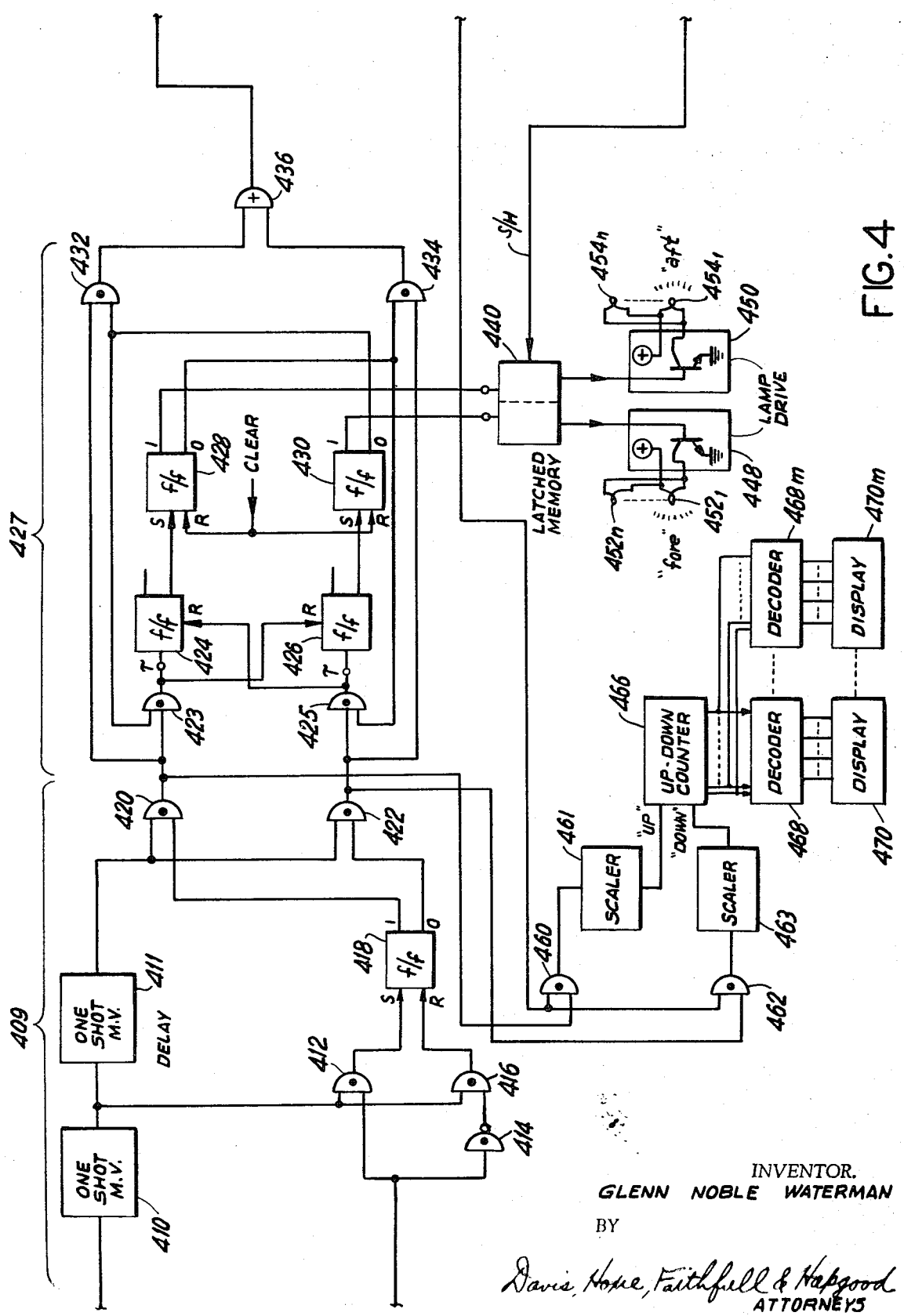
Figure 5:
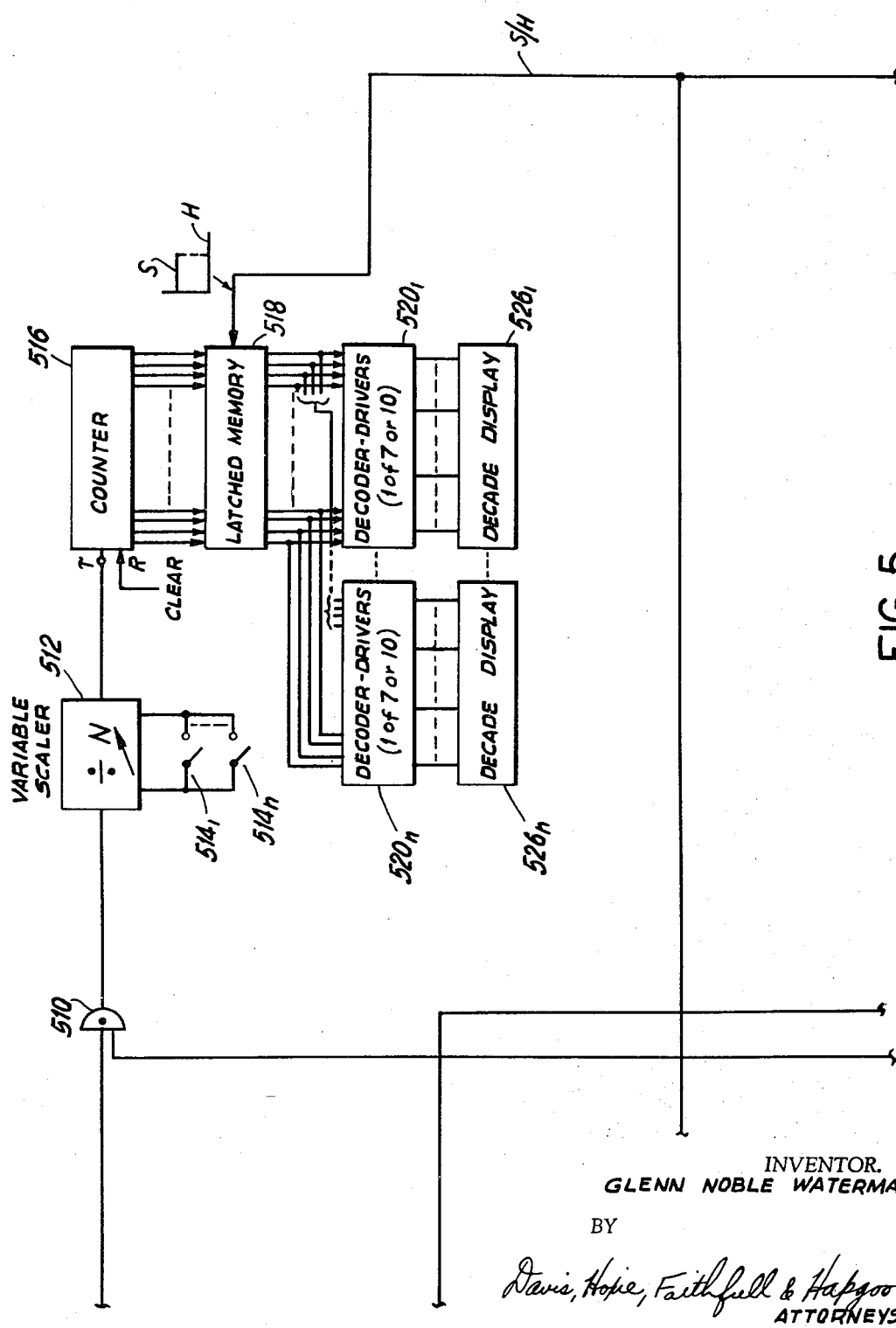

The interrupted square wavetrain output of the threshold circuit 140 is supplied to the gated feedback loop of FIG. 2, and also supplied to circuitry (FIG. 1) which generates timing signals for controlling the incidence of the transmit pulses, and for developing a strobe signal for periodically enabling the FIG. 2 feedback loop about the center of the received return pulses for best system performance.

Figure 7A:
FIGS. 7A–7G depict the voltage waveforms associated with strobe pulse generating circuitry in the system of FIGS. 1–6.
Figure 7B:
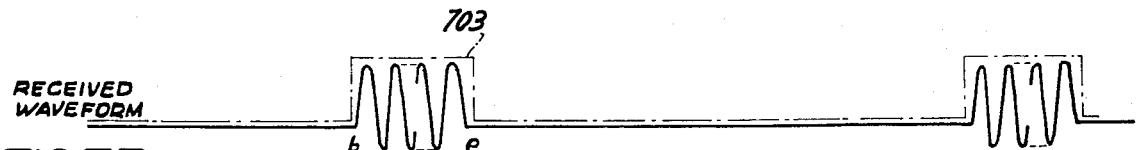
Figure 7C:
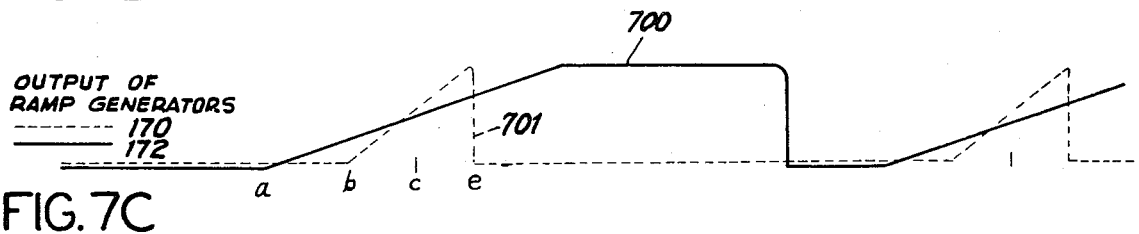
Figure 7D:
Figure 7E:
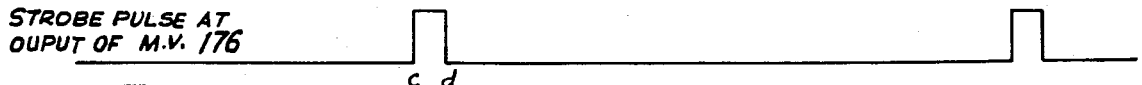
Figure 7F:
Figure 7G:

Examining first the timing circuitry of FIG. 1 in conjunction with the associated waveforms of FIGS. 7A–7G, the transmitted sinusoidal bursts are depicted in FIG. 7A, and the corresponding reflected and received bursts in FIG. 7B. A ramp generator 172 is employed to selectively produce a relatively slow ramp (solid waveform 700 in FIG. 7C following a time $a$ therein) when its output is unclamped from ground by a gate 166, e.g., when a transistor 165 becomes nonconductive. A second ramp generator 170 provides a relatively rapid ramp function (dashed waveform 701 in FIG. 7C following a time $b$ therein) when its output is unclamped by a gate 164, as when a transistor 165 is not conducting. The output from the ramp generators 170 and 172 are supplied to a comparator (difference) circuit 174 which triggers a one shot multivibrator 176 when the output voltage from the fast ramp generator 170 exceeds that of the slow ramp generator 172.

Taking as a starting point in a typical timing cycle a transmit pulse at the "1" output of monostable multivibrator 158, this pulse persists from a time $o$ to a time $a$ (FIG. 7G), and the radiated sinusoidal pulse (FIG. 7A) has similar time bounds. At the end of this pulse (time $a$), the low voltage at the "1" output of multivibrator 158 shuts off the gate 166, allowing generator 172 to develop the slow ramp, as shown for the waveform 700 in FIG. 7C following time $a$.

The reflected signal is received during the period $b$–$e$ of FIG. 7B, and a peak detector 160 generates a voltage waveform corresponding to the positive envelope of the received signal as shown by the dashed-dotted curve 703 in FIG. 7B. This waveform is negated by an element 162 which thereby shuts off gate 164 for the interval $b$–$e$ thus allowing the output of ramp generator 170 to rise (waveform 701 in FIG. 7C following the time $b$).

The output voltage of generator 170 increases in voltage faster than that of the generator 172, and exceeds the output of the generator 172 at the time $c$ at or near the middle of the received pulse. Accordingly, the comparator 173 switches state from time $c$ (FIG. 7D) until the end of the received pulse at time $e$. The output of the comparator 174 (FIG. 7D) triggers a monostable multivibrator 176 which is timed to supply an output pulse for the interval c–d of FIG. 7E.

The output of multivibrator 176 occurs about the center of the received pulse (FIG. 7B), and is used as a strobe signal to enable the FIG. 2 feedback loop as discussed below.

To complete a timing cycle of operation, the pulse output from the multivibrator 176 is delayed by a unit 152 the output of which triggers the one shot multivibrator 158 via an OR logic gate 156 to initiate a new transmit pulse, and thereby also a new cycle of operation. Finally, a ramp generator 154 and a threshold circuit 155 are coupled between the "1" output of the multivibrator 158 and the OR gate 156 to initiate a first cycle of operation, and to initiate successive cycles if a trigger pulse is somehow suppressed or otherwise not forthcoming, e.g., if no returned signal is received or the timing loop interrupted. The ramp generator 154 is normally reset by the multivibrator 158 before it can trigger the threshold circuit 155, and thus has no effect when the system is operating in the normal cycling mode described above.

The pulsed burst of square wave signals developed by the threshold circuit 140 each receiving cycle are supplied to the gated feedback circuit of FIG. 2, along with the strobe pulses at the output of the multivibrator 176 which occur at the center portion of the square waves. The purpose of the FIG. 2 gated feedback circuitry is to constrain a voltage controlled oscillator 240 to emit a continuous, noninterrupted sinusoidal signal having the same frequency as the square waves from the circuit 140 which are supplied only on a pulsed basis.

The strobe signal is employed to improve system accuracy and reliability. In particular, as the propagation distance from the ship to the reflecting layer increases, a corresponding increase is effected in the width of the radiated beam as it strikes the reflecting layer. Accordingly, the duration of the return pulse (the interval b–e in FIG. 7B) increases since all parts of the intersection of the radiated acoustical beam with the reflecting surface contribute in some measure to the return signal. As clear from the waveform 700 in FIG. 7C, the output of the ramp circuit 172 attains an increasingly higher potential as the interval between the emitted and returned pulse increases. Accordingly, it takes the output of the fast ramp generator 170 an increasingly long time, measured from the beginning of a return signal to reach the time c where the strobe pulse begins. Thus, the arrangement of FIG. 1 generates the strobe pulse at or near the center of the received pulse, where data is best obtained — e.g., for accuracy and optimum signal strength, independent of the water depth with its corresponding variation in return pulse width.

The strobe pulse from the multivibrator 176 opens a gate 200 to pass the center portion of the pulse burst from the threshold circuit 140 to the input, error sensing portion of the gated frequency tracking loop and, in particular, to the set input terminal of a J-K flip-flop 215. The feedback loop operates in three distinct modes under control of three gates 234, 244 and 246. For the entire duration of the strobe pulse, the gate 234 is open operatively connecting the control input of the voltage controlled oscillator 240 into an active feedback loop state, while the gate 244 is held off by an inverter 232 to disconnect the control input of the oscillator 240 from the output of a sample and hold circuit 250.

At the beginning of the strobe period, with only the gate 234 open, the output of the flip-flop 215, a square wave — asymmetrical for the general case — is passed to an average value detector 225, e.g., a low pass filter. The detector 225 supplies an output to a forward gain amplifier 226 which is proportional to the average value of the output waveform of the flip-flop 215. This, in turn, depends upon the off vis-a-vis on intervals for the active flip-flop output device, i.e., depends upon the amount and polarity of the output asynchronism. The output of the amplifier 226 comprises a voltage which, when applied to the oscillator 240 via the gate 234, is of a value to operate the oscillator at the same frequency as the input signal applied to the flip-flop set terminal.

For steady state operation when the input and output frequencies are alike, the input signal repetitively sets the flip-flop 215 and the output of the oscillator 240, applied to the clock, or toggle input, resets the flip-flop. The relative phasing of the two signals is automatically adjusted to develop the proper on-off periods for the flip-flop output to develop the required oscillator control voltage. As the input frequency changes, the on-off periods (in general asynchronous or nonsymmetrical) of the flip-flop changes to vary the oscillator 240 control voltage to track the incoming frequency, the response of the feedback loop and its dynamic range being dependent upon its forward gain transfer characteristics, frequency characteristic and the like. Accordingly, for the full duration of the strobe pulse, the oscillator 240 directly follows the incoming square wave in frequency.

A short while after the beginning of the strobe pulse and as determined by a one shot circuit 228, an AND gate 230 is fully switched and opens the gate 246 for the remainder of the strobe interval. This connects the amplifier average value output of the amplifier 226 (effectively the control voltage required to set the oscillator 240 to the proper frequency) to an average value network 248 having a large reactive inertia (long time constant), and which changes output potential slowly. Accordingly, the network 248 will slowly track the output of the amplifier 226 each cycle and, by reason of its inertia, provide an output voltage to the sample and hold circuit 250 which essentially represents the average of the most recently encountered control voltage outputs of the amplifier 226.

Following the end of the strobe pulses for the interval between consecutive such pulses, both gates 246 and 234 are closed and the gate 244 opens. The output potential of the sample and hold 250 thus controls the oscillator 240 during this time, supplying it with a control voltage which is the average of the dynamic control voltages impressed on the oscillator 240 by the amplifier 226 during the more recent strobe intervals. Accordingly, the output frequency of the oscillator 240 between strobe pulses comprises the average of the incoming square wave frequency during these more recent strobe periods. The response of the sample and hold path is made slow since the large inertia of a ship prevents rapid speed changes, and marked return frequency changes cannot occur.

In summary then regarding the FIG. 2 frequency tracking circuitry, the oscillator 240 supplies a continuous oscillation which corresponds in frequency to that of the incoming square waves which are present for only repetitive short time intervals.

The continuous sinusoid at the output of the oscillator 240, embodying the Doppler frequency shifted information, is supplied as one input to a mixer 316 (FIG. 3), and also passes via a 45° phase shifting lead network 320 to a mixer 318. The output from the radiated signal source oscillator 145 is directly supplied as a second input to the mixer 316, and supplied to an input port of the mixer 318 via a 45 degree phase lag network 322. Since the frequencies supplied to the lead and lag networks 320 and 322 are constrained to a narrow range, these networks may simply comprise passive resistive and capacitive impedances. Filters 324 and 328 are connected to the outputs of the mixers 316 and 318, and comprise low pass filters to select and pass therethrough only the first order difference frequency $f_r-f_o$ of the many sum and difference products generated by the non-linear mixers 316 and 318. Thus, the outputs of the filters 324 and 328 are sinusoids of a Doppler difference frequency $f_r-f_o$ which are a direct measure of the fore-aft velocity component of the ship. However, the phase of the output signals from the filters 324 and 328 differs, with the sinusoid at the output of the filter 328 lagging the output of the filter 324 by 90 electrical degrees if $f_r$ exceeds $f_o$ (vessel moving ahead), and leading by 90° if $f_o$ exceeds $f_r$ (vessel heading astern).

Figure 8A:
FIGS. 8A through 8F are timing diagrams depicting the voltage waveforms associated with digital computation circuitry in the system of FIGS. 1–6.

The outputs from the filters 324 and 328 are respectively supplied to squaring circuits 326 and 330 which transform the input sinusoidal waveform to digital, or square wave form for subsequent digital processing. The squaring circuits may comprise, for example, threshold Schmitt trigger embodiments. The nonphase-shifted, reference output from the squaring circuit 326 is shown in FIG. 8A and the output of the squaring circuit 330 is shown in FIG. 8C (90° phase lag for motion ahead) and 8E (90 degrees phase lead for motion astern).

The frequency of the square wave present at the output of the squaring circuit 326 (or the equivalent square wave frequency at the output of the element 330) is a direct measure of the Doppler frequency shift, and thus of ship's speed. A pair of headphones 344 may be connected under operator control by a switch 342 to the circuit 326 through an audio amplifier 340. The pitch of the audio reproduced by the phones 244 supplies a quick and easily discernible indication of the ship's for-aft speed to an operator primarily focusing his attention elsewhere, e.g., upon piloting activities.

The audio indication approximates the absolute for-aft velocity of the ship, uncorrected for changes in the ocean wave propagating characteristic, and without supplying forward vis-a-vis aft information. Circuitry 409 (FIG. 4) is provided to digitally identify a ship's motion as being ahead or astern, and includes a one shot multivibrator 410 which is adapted to supply a pulse (FIG. 8B) at each trailing edge of the square wave supplied by the squaring circuit 326. The pulse output of the one shot multivibrator 410 partially enables two AND gates 412 and 416 during a relatively short sampling interval once during each cycle of the square wave supplied by the circuit 326. The phase shifted square wave output of the squaring circuit 330 (FIG. 8C for motion ahead and FIG. 8E for motion astern) is directly supplied as a second input to the AND gate 412 and via an inverter 414 to a second input of the AND gate 416 (FIGS. 8D-ahead and 8F-astern).

Figure 8B:
Figure 8C:
Figure 8D:

If the ship is moving ahead, the AND gate 412 will be fully energized and switched once each square wave cycle since both of its inputs will be at a relatively high voltage condition during the relatively high voltage sampling output of the one shot multivibrator 410 (FIGS. 8B and 8C). For this condition, the AND gate 416 will not switch, since the output of the inverter 414 (FIG. 8D) is always low during the gating interval. Accordingly, the fully enabled AND gate 412 energizes the set terminal of a flip-flop 418, and the relatively high voltage at the "1" output of the flip-flop 418 continuously energizes one input of an AND gate 420. The pulse output from the one shot multivibrator 410 is supplied to a second input of the AND gate 420 via a delay element 411, and also to an AND gate 422. With the flip-flop 418 in the set condition, a delayed replica of the output from the one shot multivibrator 410 is developed once each cycle at the Doppler difference frequency rate. These pulses fully enable the gate 420 which thus has a like pulse train at the output thereof. Thus, the output of the AND gate 420 comprises a sequence of pulses having a repetition rate which is a direct measure of the velocity of the ship in the forward direction.

Figure 8E:
Figure 8F:
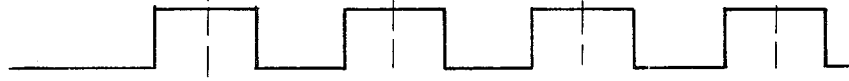

With the ship moving ahead, the flip-flop 418 is set and the unenergized "0" output thereof disables the AND gate 422 which is thus inhibited from switching. When the ship moves astern, the output of the squaring circuit 330 lags the reference wave from the circuit 326 by 90° (FIG. 8E). Accordingly, when this condition obtains, the gate 416, supplied with the inverted replica of the phase advanced square wave (FIG. 8F), is fully enabled and drives the flip-flop 418 to a reset condition. The "1" and "0" outputs from the flip-flop 418 respectively disable and partially enable the AND gates 420 and 422, thus permitting only the AND gate 422 to pass the rearward velocity indicating pulses supplied by the one shot multivibrator 410 and the delay 411. Hence, pulses are developed at the output of the AND gate 422 when the ship is moving astern and at the output of the AND gate 420 when the ship is moving ahead.

The Doppler rate of the signals at the output of the gate 420 or 422 provides a measure of velocity front and rear. The number of such pulses, being in essence the integral of the rate, provide a direct measure of distance travelled front and rear.

The outputs from the AND gates 420 and 422 are supplied to circuitry 423 which is provided for reliability considerations, i.e., to require that two consecutive pulses be supplied from the output of either the gate 420 or 422 before a "fore" vis-a-vis "aft" indication is displayed. Assuming that the vessel is traveling ahead, repetitive pulses appear at the output of the AND gate 420 and not at the output of the gate 422. A flip-flop 424 is provided to count the output pulses from the AND gate 420 through a normally enabled AND gate 423 and, responsive to the second such pulse, the flip-flop 424 sets a flip-flop 428. The "0" output of the set flip-flop 428 thus exhibits a low voltage which blocks switching of an AND gate 434 thereby inhibiting any spurious "aft-motion" indicating pulses spuriously developed at the output of the AND gate 422 from reaching an OR gate 436 and subsequent processing apparatus. Further, the low voltage at the "0" output of flip-flop 428 disables an AND gate 425 to effectively isolate erroneous pulses from the verifier and direction designating circuitry 427. Thus, responsive to the requisite two output pulses from the gate 420, spurious rearward velocity pulses are inhibited from having any electrical effect.

The AND gates 423 and 425 are adapted to reset the pulse counting flip-flops 426 and 424, respectively, if the incoming pulses alternate between fore and aft indications. Once the requisite two consecutive direction signaling pulses have been received, one of the gates 423 or 425 is inhibited from any further effect by the low voltage output from the flip-flop 430 or 428.

The flip-flop 428, like a corresponding flip-flop 430, initially resides in a reset condition. Thus, the "0" output from the flip-flop 430 is initially high and partially enables an AND gate 432 which therefore passes all forward velocity indicating pulses generated at the output of the AND gate 420. These forward motion pulses are passed through the OR gate 436 for eventual counting, and velocity and distance measurement.

Correspondingly, if the boat is moving astern, a flip-flop 426 counts two output pulses from the gate 422 via a normally operative AND gate 425 and sets the flip-flop 430, thereby disabling the AND gate 432 from passing any spurious forward motion indicating pulses. Further, the "0" output of the flip-flop 428 remains high and partially enables the AND gate 434, thereby passing the astern velocity indicating pulses from the gate 422 to and through the OR gate 436. The set flip-flop 430 also blocks the AND gate 423 to cut off the flow of any spurious forward pulses developed by the gate 420.

The output of the OR gate 436 comprises a sequence of pulses having a repetition rate which identifies the velocity component of the vessel along the sensed axis, whether forward or astern. An increasing repetition rate for pulses supplied by the OR gate 436 identified increased ship's speed (either forward or astern), and vice versa.

The direction of travel of the ship is indicated by an illuminated one of two lamp groups 452 or 454 which are respectively energized by lamp drivers 448 or 450 when the ship is traveling fore or aft. One pair of lamp groups 452 and 454 are included in each output display. Control for the lamp drivers 448 and 450 is derived from the "1" outputs from the flip-flop 428 and 430 acting through a memory 440, with the "1" output of the flip-flop 428 being high if the ship is traveling ahead and the "1" output of the flip-flop 430 being high if the ship is traveling astern as discussed above. The two-stage latched memory 440 receives as inputs the outputs of the flip-flops 428 and 430, and also a control signal which selectively constrains the memory 440 to operate in a sample (track) or hold (store) mode. More specifically, the outputs of the latched memory 440 will follow and reproduce the data input signals when the memory is in a sample mode (a high "sample" input control voltage) and will retain the last sampled input voltages when the control signal becomes a relatively low (hold) voltage. The outputs from the memory 440, in turn, illuminate only one of the lamp groups 452 or 454 depending upon the state of the flip-flops 428 and 430 at the critical control voltage transition from a sampling to a hold voltage level.

The velocity magnitude indicating pulses present at the output of the OR gate 436 pass through a normally enabled AND gate 510 (FIG. 5) to a pulse frequency dividing scaler net work 512 which illustratively comprises a digital counter having a signal output from the most significant digit stage thereof. In accordance with standard known techniques, a plurality of parallel-connected switches $514_1$ through $514_n$ are employed to alter the counter capacity when any one or more of the switches is closed. The switches 514 are normally distributed with the output information displays at various points about a vessel to provide for control at any of these points.

The variable scaler 512 is adapted to reduce the rate of Doppler difference frequency pulses to provide an output display in conventional engineering units (knots, feet per second or the like). As discussed below, the output display is generated by counting the number of divided pulses which occur in a corrected, cyclical time span, e.g., approximately one second. Thus, the scaler 512 wired for a first count capacity may be operative to divide down the Doppler difference frequency such that each pulse at its output may effectively represent a forward-aft velocity of one foot per second for the nominal one second gating interval or, with a switch 514 closed to change the scaler count capacity, a speed of one-tenth of a knot. The pulse output of the scaler 512 is supplied to the count input of a digital counter 516, typically of a binary coded decimal configuration.

Figure 6:
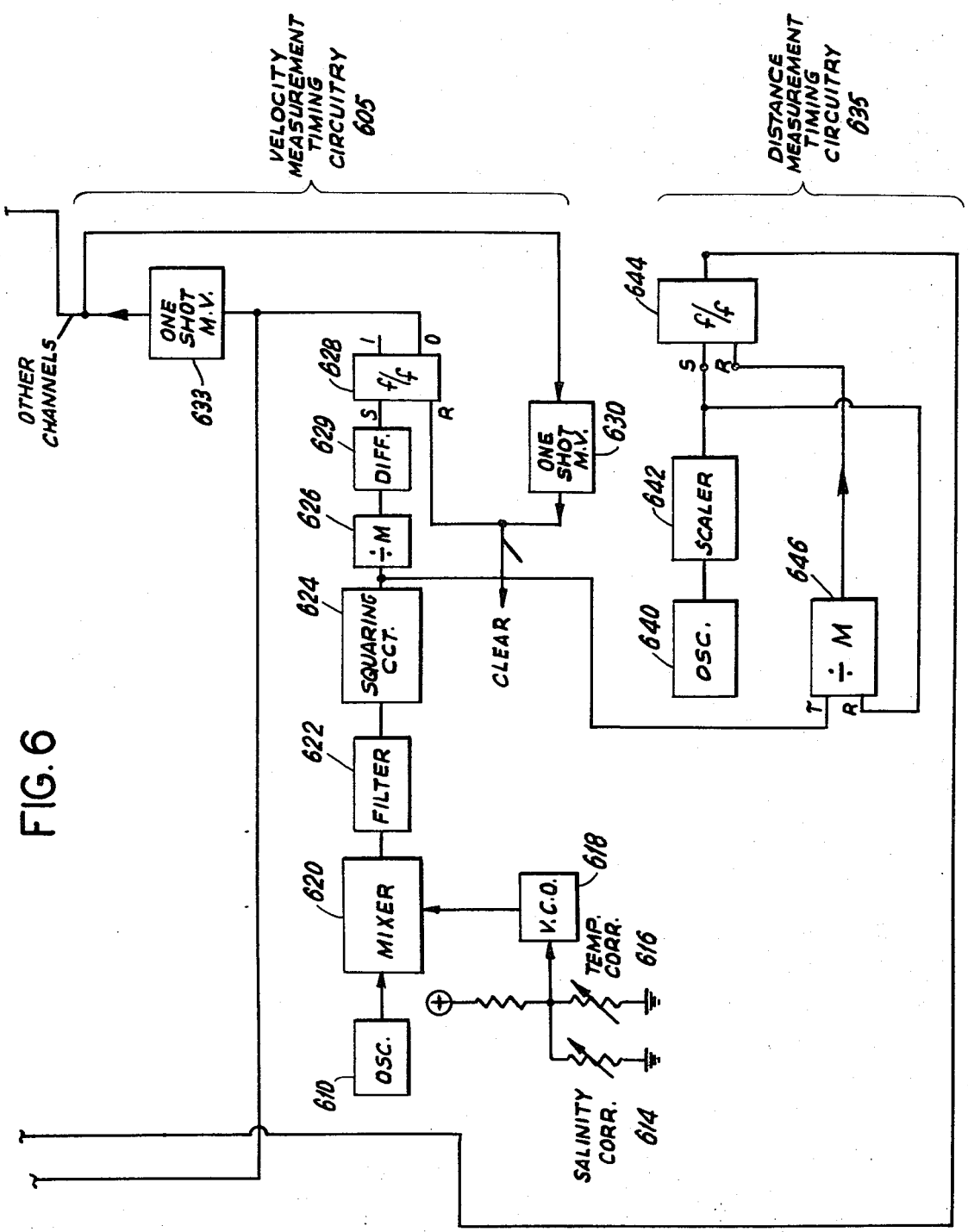

Circuitry 605 for developing periodic sample/hold and CLEAR signals to cyclically examine (sample) and reset the counter 516 for converting the continuum of Doppler difference pulse into a velocity indicating cyclic accumulation is shown in FIG. 6. The timing circuitry 605 of FIG. 6 is operative in conjunction with the count capacity of the scaler 512 to provide a counter pulse accumulating interval such that the peak count state of the counter 416 supplies a direct indication of a particular component of ship's velocity. This gating interval has some nominal value, e.g., one second, which is corrected to offset the inverse dependence of the Doppler difference frequency upon the propagation velocity of sound in water. Accordingly, the circuitry of FIG. 6 is adapted to take the salinity and temperature of the ocean into account since these are the principal factors in the change of acoustical velocity in the fluid medium. More specifically, the circuitry 605 normalizes the gating interval to render the navigation system of FIGS. 1 through 6 operative and accurate to any medium propagation characteristic.

An oscillator 610 supplies a sinusoidal output to a mixer 620, with a second input for the mixer comprising the output of a voltage controlled oscillator 618. Variable resistors 614 and 616 are employed to vary the control voltage input to the voltage controlled oscillator and, thereby also, to vary its output frequency. The variable resistors 614 and 616 may be manually operated by dialing in measured or known temperature and salinity values or, alternatively, these resistors may comprise transducers having impedances or output voltages which vary with parameters actually sensed. Further, the input of the voltage controlled oscillator may be derived from a velocimeter which directly supplies an output voltage which varies with the acoustical propagating speed of the ocean.

The mixer 620, operative in conjunction with a low pass filter 622, produces a sinusoidal output voltage having a frequency which has a nominal value to give rise to the normal gating interval (e.g., one second) after further processing, but which has a frequency correction to account for deviations in the ocean propagation characteristic from a predetermined norm. A squaring circuit 624 converts this extracted sinusoidal signal to digital form, and the resulting square wave signal passes to a scaling, or pulse dividing net work 626. The scaler 626 reduces the pulse repetition rate to the desired corrected gating interval, e.g., approximately 1 second. That is, the output from the scaling circuit 626 is adapted to comprise an output pulse which sets a flip-flop 628 about once each second acting through a differentiator 629.

The zero output terminal of the flip-flop 628 returns to a low voltage condition when the flip-flop becomes set, thereby generating a negative going transient which triggers a one shot multivibrator 633 for producing one pulse each second which is slightly delayed from the output of the scaler 626. This output pulse, illustratively comprising a transition from a low voltage to a relatively high voltage and back again, gives rise to two independent circuit operations. First, this pulse is supplied to the latched memories 518 (FIG. 5) and 440 (FIG. 4) to operate these memories in a track or sample mode. While tracking, these memories attain and internally store the digital values of the input signals supplied thereto, with these stored signals being present at the output of the memories 440 and 518. When the "sample" output pulse from the one shot multivibrator 633 terminates, the memories 440 and 518 are returned to their normal hold state, with the signals stored during the sampling interval being retained at the output of the memories until the next sample level pulse is received.

The output from the one shot multivibrator is also supplied to an additional delay producing one shot multivibrator 630 which produces a CLEAR output pulse a fixed time after the sample level pulse has been produced. This CLEAR pulse resets the flip-flop 628 until the next following gating pulse is received from the scaler 626; resets the flip-flops 428 and 430; and resets the velocity magnitude counter 516 to initiate a new axial velocity measuring operation.

The velocity measurement stored in the memory 518 (velocity magnitude but not direction) at the end of each cyclic sampling interval is displayed by a plurality of decade displays $526_1$ through $526_n$ which may be disposed at various positions about the ship, i.e., in the control room, on the bridge, and elsewhere. The output from the memory 518 is supplied to a plurality of decoder-drivers 520 which perform a data conversion function which depends upon the requirements of the displays 526. The decoder-drivers 520 are well known to those skilled in the art and may comprise, for example, apparatus for converting binary coded decimal information to lamp display driving one out of seven or one out of ten codes. The latched memory 440 gives rise to the requisite directional information by illuminating either one of the lamp groups 452 or 454 to respectively indicate whether the ship is heading fore or aft.

With the above-described circuitry in mind, an illustrative velocity measuring sequence of circuit operation for the navigation system of FIGS. 1–6 will now be described in conjunction with the above-considered fore-aft motion channel which is illustrative of the other (port-starboard) channel 185 as well.

The multivibrator 158 repetitively opens gate 148, thereby energizing the transducer 100 which emits pulse bursts of sinusoidal acoustical energy forward and downward toward a reflecting medium. The energy is supplied to the transducer by the oscillator 145, the gate 148, and a power amplifier 150. A portion of the radiated energy is reflected back to and recovered by the transducer 100, and amplified by the amplifier 110 which is operative after a blanking interval corresponding to the pulse transmission period.

The ramp generator 172 develops a slowly rising ramp following the transmission period, and the ramp generator 170 produces a relatively fast rising ramp at the beginning of a received pulse. The comparator 174 and the one shot multivibrator 176 generate a strobe pulse at the center of each received pulse. A replica of the strobe pulse, delayed by the unit 152 by a sufficient interval to complete processing of each received signal, triggers the multivibrator 158 via the OR gate 156 to initiate a following cycle.

The ramp generator 154 and threshold circuit 155 are provided to ensure that transmit periods will recur if a return signal is not received. The element 154 is normally periodically reset by the output of the multivibrator 158 before it can trigger the threshold circuit 155, and performs no system function when return signals are properly being processed.

The received signal pulse bursts are distinguished from noise in a threshold circuit 140 and supplied with the strobe pulses to the frequency tracking gated feedback loop of FIG. 2. The output of the voltage controlled oscillator 240 in FIG. 2 is a continuous sinusoid having the same frequency as that of the individual cycles in the pulse bursts. The gate 234 is open for the duration of the strobe pulse to complete a fast response feedback loop such that the oscillator 240 operates exactly in frequency with the coincidentally supplied input pulse.

During the latter portion of the strobe pulse, the gate 246 opens, and a network 248, having a slow response, tracks the oscillator 240 control voltage at the output of the amplifier 226 in the fast feedback loop. Between strobe pulses, the gate 244 opens, and the sample and hold circuit 250 maintains the oscillator 240 at a continuous output frequency essentially corresponding to the time average of the frequencies of the most recent input pulse bursts.

Also, the fixed and voltage controlled oscillators 610 and 618 generate recurring velocity measuring interval gating pulses which, after digital processing, are produced at the output of the one shot circuit 633. The mixer 620 receives the output of the oscillator 610 and the output of the voltage controlled oscillator 618 which effects a salinity and temperature water propagation speed correction, and the selected first order mixer output frequency is converted to digital form by the squaring circuit 624. The frequency output of the squaring circuit 624 is divided down by the scaler 626 which repetitively sets the flip-flop 628 at approximate one second intervals corrected for variations in the ocean wave propagation speed. The negative voltage transients at the "0" output of the flip-flop 628 are coupled to the one shot multivibrator 633 which responds thereto by supplying positive going data sampling pulses having a relatively short time duration and a repetition rate of approximately one cycle per second. The sampling pulses are supplied to the latched memories 440 and 518 to temporarily operate these memories in the sample mode, quickly returning to the normal hold mode. Thus, the latched memory 440 samples directional information (fore or aft) approximately once each second and, coincidentally therewith, the memory 518 stores the velocity magnitude information manifested by the contents of the counter 516.

The velocity directional and magnitude information (and distance travelled and other information as discussed below) is developed by mixing the output of the oscillator 145, which is a replica of the emitted signal, with the output of the controlled oscillator 240, which is a continuous representation in frequency of the reflected pulses received by the transducer 100. These two signals are mixed without relative phase shift in the mixer 316 and with 90° relative phase shift in the mixer 318. The like Doppler difference frequency outputs of the mixers 316 and 318 are converted to digital form by squaring circuits 326 and 330, and the resulting square wave outputs, having a 90° phase shift therebetween are supplied to the circuitry 409 for substantially determining direction information. This directional identification is accomplished by steering the Doppler difference frequency to the output of the AND gate 420 if the ship is moving forward, or to the output of the AND gate 422 if the ship is moving astern. This signal steering, in turn, is effected by sampling the phase shifted square wave output of the circuit 330 during a fixed point of each reference square wave, the gate 412 being operative to set the flip-flop 418 if the ship is moving forward (the phase shifted output of the circuit 330 being positive during the critical sampling instant). Alternatively, the gate 416 resets the flip-flop 418 (the output of circuit 330 being negative at the critical sampling instant) if the ship is moving astern. The AND gate 420 passes delayed pulses, corresponding in frequency to the Doppler difference frequency, through the AND gate 420 after the flip-flop 418 is set (a high voltage on the flip-flop "1" output terminal) and the gate 422 passes this Doppler difference frequency information if the "0" output of flip-flop 418 exhibits a relatively high output voltage.

Circuitry 423 verifies that two consecutive forward motion indicating pulses or two consecutive rearward indicating pulses are received and, responsive to one of these conditions obtaining, locks up the circuitry 423 for the duration of the sampling cycle. If the vessel is identified as going forward, a gate 432 is continuously enabled to pass velocity metering pulses for measurement via the OR gate 436. If the boat is moving astern, the AND gate 434 passes the difference frequency information through OR gate 436.

Both of the gates 432 and 434 are initially enabled by the "0" outputs of the flip-flops 428 and 430 at the beginning of a velocity measuring cycle. Similarly, the AND gates 423 and 425 are normally enabled by the "0" outputs of these flip-flops. When two consecutive inputs are impressed on one of the leads to the verifier circuit 423, the corresponding counting flip-flop 424 or 426 sets an associated flip-flop 428 or 430, thereby impressing a low voltage at the "0" output of the flip-flop. This low flip-flop "0" output voltage disables one of the AND gates 432 or 434 and disables a corresponding one of the AND gates 423 or 425 to isolate and block any spurious pulses indicative of motion opposite to the actual direction of travel of the vessel.

The flip-flop 428 is set (a high "1" output voltage) if the vessel is moving forward and the flip-flop 430 is set if the vessel is moving astern. The memory 440 examines these flip-flops during the critical sampling interval, and between sampling times, illuminates the lamp group 452 or the group 454 to indicate that the vessel was detected as moving either forward or astern during the most recent sampling interval.

The pulses at the output of the OR gate 436, indicative of velocity magnitude but not direction, are normally passed through the AND gate 510 and are divided down by the scaler 512. The capacity of the scaler 512 is adjusted by particular settings of the switches 514 such that the output of the scaler supplies pulses having a significance measured by a standard engineering unit. For example, if a Doppler difference frequency of 300 cycles per second corresponds to a forward speed of one knot, the scaler might advantageously have a capacity of 30 states to divide the input pulses by a factor of 30, such that each output pulse supplied to the counter 516 represents a velocity for the normal 1 second gating interval of one-tenth of a knot. The switches, which might be more than one in number, can make several adjustments. For example, the scaling factor may be changed to vary the significance of each output pulse from one-tenth of a knot to one foot per second. Alternatively, the capacity could be changed to effect a division by three such that each output pulse would identify 100th of a knot.

The output pulses which occur during the approximate 1 second gating interval since the counter 516 was reset by the last CLEAR pulse are successively stored in the counters 516. The counter 516 is normally disconnected from the displays, since the "hold" level control signal output of multivibrator 633 constrains the latched memory 518 to present to the decoder drivers 520 only the velocity information derived during the last sampling interval. At the end of the approximate one second gating interval, the control input of the memory 518 momentarily changes to the sample mode and the contents of the counter 516 are registered in the latched memory 518. At this time, the relatively low sample/hold control signal blocks the AND gate 510 from passing any further velocity augmenting pulses. The latched control then returns to its normal hold state when the one shot multivibrator 633 times out, and the contents of the counter 516, directly indicative of the velocity component under study, is decoded and displayed by the units 526.

Shortly after the sample/hold signal returns to normal, a CLEAR pulse is developed by the one shot multivibrator 630 which clears the above-enumerated flip-flops and the counter 516 to initiate a new velocity measuring operation. In the gating interval between sampling pulses, the velocity direction and magnitude last computed are displayed by the lights 452 or 454, and by the displays 526.

Thus, the above-described digital data processing apparatus has been shown by the above to reliably measure and display the direction and magnitude of ship's velocity along its fore-aft axis. Circuitry identical to that described above is included in the control and display circuit 185 associated with a sensing axis orthogonal to that for apparatus considered in detail above, i.e., abeam of the vessel for the assumed case.

The above-described mode of operation for the navigation system of FIGS. 1-6 may be practiced where a convenient scattering surface exists to reflect a fair portion of the emitted signal back to the transducer 100. Where no such layer exists, e.g., for some very deep water bodies without stratified water masses, a switch 222 may be closed, such that a replica of the transmit pulse from the multivibrator 158, delayed by a variable delay 220, opens the gate 200 after each transmit pulse. Any reflected energy returned to the transducer 100 during this pseudo strobe pulse interval, and large enough to pass through the threshold circuit 140, is fed to the frequency tracking feedback loop of FIG. 2. Such energy may be reflected from algae, or other particle matter in the water, with the delay of unit 220 being adjusted to obtain the best possible data. The remainder of the system circuitry operates as before to yield the velocity measurements from the continuous output of the frequency tracking loop, except that the circuit members 154 and 155 provide its recurring system timing.

Also, reliable measurements may be derived in conditions of heavy seas, where the vessel is rolling (and/or pitching) considerably. When this environmental condition obtains, a switch 215 (FIG. 2) is closed thereby connecting the output of a threshold circuit 205 to the gate 200. An inclinometer 210 supplies a voltage to the threshold circuit 205 which is a function of its vertical orientation and, thereby also, of the ship's vertical orientation. When the ship is other than in a vertical or near vertical position, the inclinometer 210 and the threshold circuit 205 supply an output which inhibits opening of the gate 200. Accordingly, at such times, the frequency tracking feedback loop is interrupted, and the controlled oscillator 240 output is maintained by the sample and hold circuit 250.

When the ship rolls through its vertical or near vertical position, the output of the inclinometer 210 switches the circuit 205 thereby removing the gate 200 inhibiting signal acting through switch 215. Accordingly, the gate 200 operates as described above to update the frequency tracking loop if required during a strobe pulse interval.

In addition to measuring velocity along the two perpendicular sensing axes, the navigation system of FIGS. 1-6 includes structure for measuring the net distance travelled along each of the two axes. Moreover, the distance computation is corrected for variations in the propagation characteristic of the ocean medium.

It will be recalled that a square wave, embodying Doppler frequency shift information, was steered through the AND gate 420 when the vessel moves ahead, and through the AND gate 422 when the vessel moves astern. Also, the repetition rate of the square wave pulses incorporates a direct measure of velocity in the given direction. Therefore, since the pulse rate identifies velocity, each individual pulse represents a given distance of travel. For example, if a Doppler frequency of 200 cycles per second corresponds to a ship velocity of 10 feet per second, each cycle (square wave pulse) represents 10/200 feet or 0.05 feet. Each pulse output from the AND gate 420 would represent 0.05 feet travelled ahead, and each pulse from the AND gate 422 would represent 0.05 feet moved astern.

If the acoustical velocity of the ocean increases, the Doppler shifted difference frequency decreases and, accordingly, the flip-flop 644 remains set for a greater part of the 1 second interval to permit the proper number of pulses (which are occurring at a slower repetition rate) to pass through the appropriate gate 460 or 462. Conversely, a decrease in the propagation velocity gives rise to a longer reset state for the flip-flop 644 such that the correct number of pulses (which occur more frequently) will pass to the counter 466. Thus, the number of pulses actually passing through a gate 460 or 462 for any given ship's velocity will remain the same for changing acoustical propagation speeds for the ocean.

The forward distance indicating pulses generated by the AND gate 460 are supplied to a scaler 461 which counts the pulses down to a desired engineering unit (mile, 100 feet, or the like). Correspondingly, the rearward distance pulses from the AND gate 462 are divided down in a corresponding scaler 463. These scalers 461 and 463 may be made variable to vary the engineering unit employed as for the scaler 512.

The scaler 461 supplies forward distance pulses to the "up" count input terminal of an up-down counter 466, and the scaler 463 is connected to the "down" counter input terminal. As the vessel moves ahead, the count state of the counter 466 increases as the scaler 461 exercises the "up" terminal, while the count state decreases when the boat moves astern as the scaler 463 pulses the "down" input terminal. Thus, the count state of the counter 466 at any time identifies the net distance travelled along the associated (fore-aft) sensing axis. This information is decoded to a seven or ten line code in one or more decoders 468, and is displayed about the ship in one or more displays 470.

The control and display circuitry 185 for the orthogonal channel includes similar apparatus to that described above for measuring the net distance travelled along the axis associated therewith.

To effect a fore-aft distance measurement, the outputs from the AND gates 420 and 422 are supplied to AND gates 460 and 462 along with a normally high, enabling timing signal from the distance timing circuitry 635 of FIG. 6. This timing signal normally partially enables the AND gates 460 and 462, and periodically blocks the gates with a low voltage for a time duration which corrects for the varying acoustical propagation characteristic of the ocean.

The ocean velocity variations are taken into account by the distance timing circuitry 635 of FIG. 6. Basically the "1" output of a flip-flop 644 is high to enable the AND gates 460 and 462 for most of a repetitive gating interval, e.g., one second. To this end, the output of a reference oscillator 640 (or of the oscillator 610) is scaled down in frequency by a divider 642 to pulse the set input of the flip-flop 644 once each second, thereby developing a relatively high output potential at the "1" output of the flip-flop 644.

Also, the output of the squaring circuit 624, quantities comprises a square wave having a repetition rate which varies with the ocean velocity characteristic as discussed above, is divided down in frequency by a scaler 646 which has a viz., capacity less than that of the scaler 642. The output of the scaler 646 periodically continuously the flip-flop 644 to temporarily block the distance pulse passing AND gates 460 and 462 until the next following output of scaler 642, which resets the scaler 646 while again setting the flip-flop 644.

The above-discussed has assumed that velocity and distance information has been desired with respect to the fore-aft and port-starboard axes of the ship. These quantities may be desired for any other orthogonal axis system, e.g., along a desired course and normal to the course. The axis system may be selected in either of two ways, viz., by physically rotating the transducers of transducer pod so that the transducers 100 and 180 continuously face their corresponding axis; or by trigonometrically operating on the output signals derived for a fixed axis system (e.g., fore-aft and port-starboard) in accordance with the well known axis rotation equations, as by a digital or analog general or special purpose computer.

An arrangement for physically rotating the axes system is shown in FIG. 1 and comprises a differential generator 130 which is supplied with the electrical output of the ship's gyrocompass 115 (indicative of actual ship's heading), and with the setting of a shaft 120 which is set to select a desired axis system. The shaft setting varies the coupling between the input and output of the generator 130, and the generator 130 supplies angular difference signals to a synchro follower 135 or other follower motor system which adjusts the orientation of the transducers 100 and 180 to the azimuth specified by the angle of the shaft 120. Many other organizations well known to those skilled in the art will also suffice for adjusting the orientation of the transducer pod to a desired position as specified by a mechanical or electrical setting.

Finally, the instantaneous drift angle of the vessel may be determined by performing a trigonometric operation (e.g., arc sin or arc tan) on the two velocity components. This may be effected by converting the digital contents of the two velocity registers (counter 516 and its counterpart in the second channel) into analog voltages in a digital-to-analog converter. The two analog signals are then supplied to any of the well known units for computing either function.

$$c = \sin^{-1}(b/a) = \tan^{-1}(b/a)$$

or the approximation $$c = (b/a) \text{ (small angle)},$$

where $c$ represents the output drift angle, and $a$ and $b$ are the two analog velocity signals. Correspondingly, identical structure can compute the long term drift angle by operating on the two axial distance measurements, i.e., the contents of the register 466 and its second channel counterpart. In addition, total distance travelled may be derived by commonly available apparatus for computing the relationship $$d = (a^2 + b^2)$$

where $d$ is the total distance, and $a$ and $b$ are analog voltages representing the distance travelled along the two sensed axes.

It is to be understood that the above-described arrangement is only illustrative of the principles of the present invention. Numerous modifications and adaptations thereof will be readily apparent to those skilled in the art without departing from the spirit and scope of the present invention. For example, energy can be transmitted downward and outward in both directions along a given axis, and the inverse frequency shifted return signals beat together in the mixers 216 and 218. This essentially doubles the output Doppler difference frequency, hence increasing system resolution and accuracy, and offsetting pitch and roll effects.

What is claimed is:

1. In combination in a pulsed Doppler navigation system, transducer means for radiating emitted energy downward and outward along a desired sensing axis and for recovering a reflected portion of said emitted pulsed energy, said returned energy portion having a frequency dependent upon the speed of said transducer means along said sensing axis; gated, normally open, feedback loop means for generating a continuous periodic output signal of a frequency related to that of the recovered pulsed energy; and means for gating said feedback loop closed when a recovered signal is available for processing.

2. A combination as in claim 1 further comprising a source of oscillations to be emitted by said transducer means, and circuit means responsive to the difference in frequency between the output of said oscillation source and the continuous periodic output signal of said feedback means for computing the velocity of said transducer means along said sensing axis.

3. A combination as in claim 2 wherein said feedback loop means comprises a voltage controlled oscillator, error signal means responsive to the output of said voltage controlled oscillator and to said returned pulse energy for producing a potential for controlling said oscillator, first gating means for selectively connecting said error signal means and said voltage controlled oscillator, control voltage storage means, and second gating means selectively connecting said control voltage storing means to said voltage controlled oscillator.

4. A combination as in claim 3 wherein said control voltage storing means comprises a sample and hold circuit, and wherein said gated feedback loop means further comprises third gating means selectively connecting said error sensing means and said sample and hold means.

5. A combination as in claim 4 wherein said error sensing means comprises a flip-flop having two input terminals thereon respectively supplied with said returned pulsed signals and the output of said voltage controlled oscillator, and average value detector means connected to the output of said flip-flop.

6. A combination as in claim 5 further comprising slow response coupling means connected intermediate said third gating means and said sample and hold means.

7. A combination as in claim 6 wherein said flip-flop included in said error sensing means comprises a J-K flip-flop having set and clock input terminals, said returned signals being connected to said set flip-flop input terminal and the output of said voltage controlled oscillator being connected to said clock input terminal.

8. A combination as in claim 2 further comprising means for disabling said feedback loop means when the vertical orientation of said system departs substantially from vertical.

9. A combination as in claim 8 wherein said vertical departure disabling means includes gate means for inhibiting said feedback loop means, inclinometer means for providing an output signal which characterizes the relative vertical orientation of said system, and circuit means for disabling said gating means when the output of said inclinometer means departs from a vertical signaling condition.

10. A combination as in claim 2 further comprising means for rotating said sensing axis with respect to a vessel in which said combination is mounted.

11. A combination as in claim 2 further comprising means for obtaining Doppler frequency shift velocity information along two orthogonal axes, and wherein said transducer means includes two transducer elements displaced at right angles on a single transducer pod.

12. A combination as in claim 2 wherein said feedback loop gating means comprises means for gating said feedback loop means into an operative condition about the midpoint of said returned energy pulses recovered by said transducer means.

13. A combination as in claim 12 wherein said feedback loop gating means comprises a relatively fast ramp generator, a relatively slow ramp generator, means for enabling the output of said slow ramp generator following transmission of a pulse of emitted energy, additional gating means for enabling said fast ramp generator at the beginning of a recovered energy pulse, and comparator means for generating a strobe gating pulse for rendering said feedback loop mean operative when the output of said fast ramp generator attains a predetermined relationship with the output of said slow ramp generator.

14. A combination as in claim 13 further comprising timing means constraining said navigation system to sequentially radiate energy pulse bursts including transmit gate means intermediate said source of oscillations and said transducer means, and means responsive to each output of said comparator means for enabling said transmit gate means.

15. A combination as in claim 14 further comprising a relaxation oscillator, threshold means for selectively enabling said transmit gate means, and means for selectively resetting said relaxation oscillator responsive to a pulse generated by said comparator means.

16. A combination as in claim 2 wherein said computing circuit means comprises means for generating first and second digital square wave signals each having a frequency reflecting the difference in frequency between the emitted and returned signals and having a relative phase dependent upon the direction of motion of said transducer means along said axis, means for sampling said second square wave signal during a predetermined point in the cycle of said first square wave signal, means responsive to the output of said sampling means for presenting information identifying the relative direction of said transducers along said sensing axis, means for developing a sequential pulse train dependent in frequency upon the frequency of one of said square waves, digital counter means for counting the pulses produced by said pulse developing means, information outputting means, latching memory means for operating said information outputting means in accordance with the contents of said counter during a sampling interval, and time gate means for periodically initializing said counter to a reference state and for periodically supplying control signals to said latching memory means.

17. A combination as in claim 16 wherein said time gate means includes means for varying said counter initializing periodicity and said control signal supplying periodicity responsive to variations in the acoustical propagating characteristic of the emitted energy propagating medium.

18. A combination as in claim 17 wherein said time gate means includes a reference oscillator, means for supplying a signal having a frequency dependent upon the acoustical propagating characteristic of the wave propagating medium, mixer and filter means for obtaining an output signal dependent upon the difference in frequency between the output of said reference oscillator and the output of said propagation characteristic dependent signal supplying means, and scaler means for periodically supplying pulses responsive to a plurality of input oscillation cycles supplied thereto by the output of said mixer and filter means.

19. A combination as in claim 18 wherein said time gate means further includes a flip-flop connected to said scaler means, said scaler means being adapted to selectively set said flip-flop, and delay means connected to an output of said flip-flop for resetting said flip-flop.

20. A combination as in claim 16 wherein said first and second digital square wave generating means comprise first and second mixer and filter means, squaring circuit means connected to the output of each of said input filters, means for supplying said emitted and returned signals to said first and second mixer and filter means, and means connected at the input of said second mixer and filter for producing a 90° relative phase shift between said emitted and said returned signals.

21. A combination as in claim 16 further comprising scaler means connected intermediate said digital counter means and said pulse developing means.

22. A combination as in claim 21 further comprising switching means for varying the pulse frequency division factor for said scaler means.

23. A combination as in claim 22 wherein said second square wave sampling means includes means for generating an output pulse responsive to a voltage transient condition for said first square wave signal, first and second AND gates each having two inputs, said voltage transient responsive pulse being supplied to one input of each of said AND gates, means for supplying said second square wave in inverted relationships to a second input of said first and second AND gates, an output from one of said AND gates signaling motion in one direction along said sensing axis and an output from the other of said AND gates signaling motion in the other direction along said sensing axis.

24. A combination as in claim 23 wherein said sampling means further comprises third and fourth AND gates, means for supplying one of said square wave signals to each of said third and fourth AND gates, a flip-flop selectively set by said first AND gate and selectively reset by said second AND gate, one output from said flip-flop being connected to said third AND gate and the other output of said flip-flop being connected to said fourth AND gate.

25. A combination as in claim 24 wherein said relative direction identifying means comprises verifier means for signaling the relative direction only after the incidence of a plurality of pulses corresponding to motion in a like direction.

26. A combination as in claim 25 wherein said verifier means includes first and second additional counting means respectively connected to said third and fourth AND gates, first and second verifier flip-flops selectively set by said first and second additional counters, additional latched memory means for developing a relative direction display dependent upon the relative states of said verifier flip-flops, and means for periodically disabling said verifier circuit for further change after one of said verifier flip-flops is set.

27. A combination as in claim 16 wherein said information outputting means comprises at least one decade display, and at least one decoder-driver means responsive to the output of said latching memory means for selectively activating said decade display.

28. A combination as in claim 27 further comprising additional receiving and transmitting transducers for producing relative frequency signals indicative of motion along at least one additional sensing axis, and means connected to said transducers for computing and displaying the direction and magnitude of motion along said additional sensing axis.

29. A combination as in claim 16 further comprising means for audibly reproducing one of said square wave signals.

30. A combination as in claim 2 further comprising means for computing the distance travelled by said system along said sensing axis.

31. A combination as in claim 30 wherein said distance computing means includes means for developing a digital square wave train having a frequency reflecting the difference in frequency between the emitted and returned signals, means for determining the relative direction of motion of said transducer means along said sensing axis, an up-down counter having up and down count input terminals, first and second gating means for connecting said square wave train to said up and down counter input terminals, respectively, said relative direction determining means including means for selectively enabling only one of said first and second gating means.

32. A combination as in claim 31 further comprising means for correcting said distance computing means for variations in the characteristics of the propagation medium.

33. A combination as in claim 32 wherein said correcting means comprises an oscillator, a flip-flop, a scaler connecting said oscillator to said flip-flop, variable frequency means having an output oscillation frequency dependent upon the propagation characteristic of said propagation medium, additional scaler means connecting said variable frequency means with said flip-flop, means connecting the output of said first scaler to initialize said second scaler, and further gating means for selectively isolating the up and down counter input terminals of said up and down counter responsive to signaling from said flip-flop.

34. A combination as in claim 2 further comprising means for computing the velocity of said vessel along two orthogonal sensing axes, and means responsive to said orthogonal velocity computations for computing the instantaneous drift angle of said system.

35. A combination as in claim 2 further comprising means for computing the distance travelled by said system along two orthogonal sensing axes, and means responsive to said orthogonal distance accumulations for computing the long term drift angle of said system.

* * * * *